March 26, 1963
A. A. SMITH ET AL
3,082,978
AIRCRAFT CONTROL SYSTEM
Filed Nov. 28, 1955
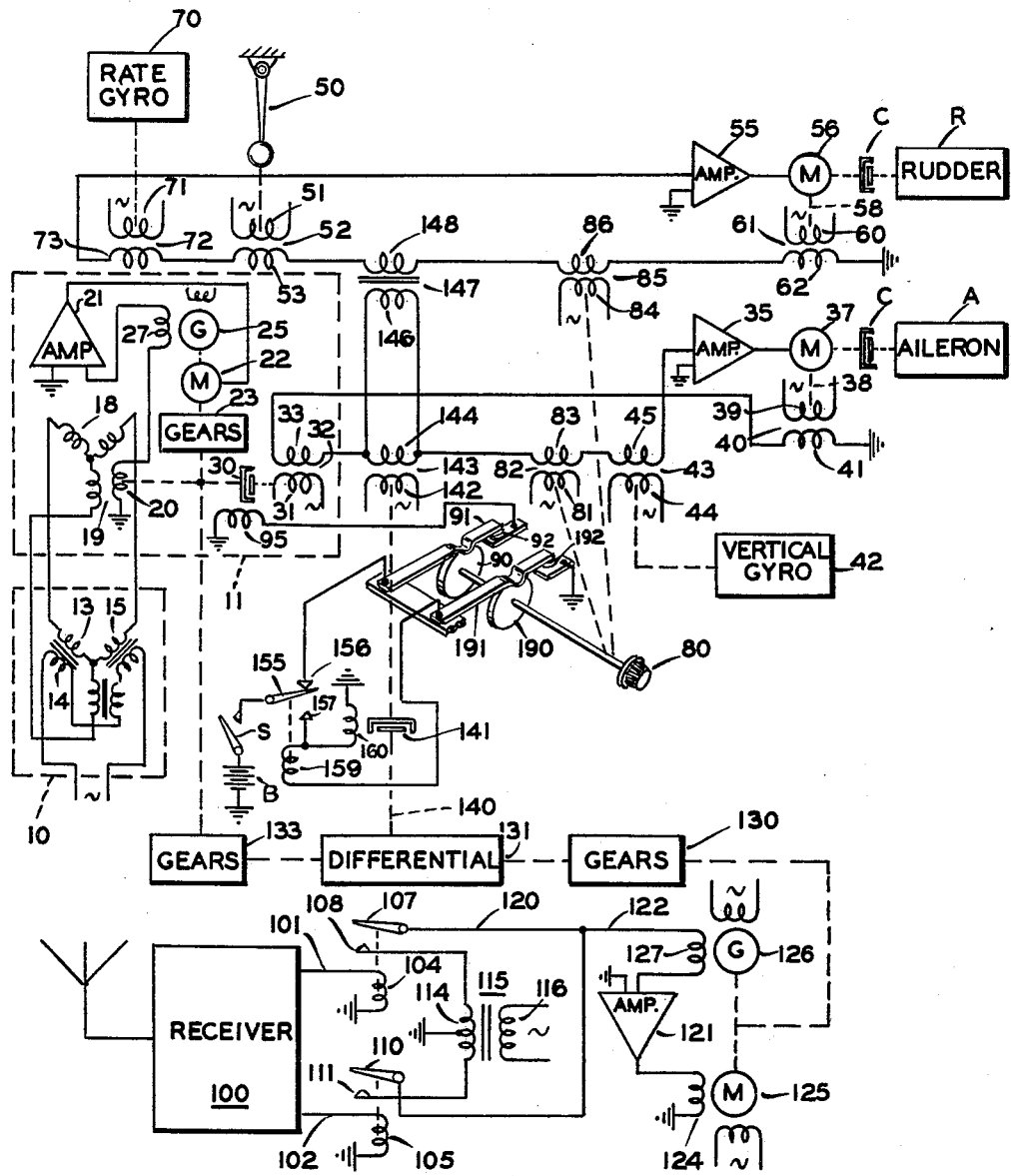
INVENTORS
RUDOLF R. SELIGER
AUBREY A. SMITH
BY Oscar B Brumback
ATTORNEY

3,082,978
AIRCRAFT CONTROL SYSTEM
Aubrey A. Smith, Fanwood, and Rudolf R. Seliger, Palisades Park, N.J., assignors to The Bendix Corporation, a corporation of Delaware
Filed Nov. 28, 1955, Ser. No. 549,378
4 Claims. (Cl. 244—77)

This invention relates generally to control systems for aircraft.

Automatic control systems for aircraft generally detect a deviation of the craft from a reference condition and apply a corrective action to return the craft to the reference condition. The corrective action normally takes into account the most desirable control of the craft compatible with the comfort of the passengers and the limitations of the craft structure. Occasionally, however, circumstances arise where a greater corrective action than normal is required for a given deviation of the craft; circumstances may also arise wherein it is desirable to control the craft from a remote transmitter with the human pilot still being able to take over control at any time.

An object of the present invention, therefore, is to provide a novel means for controlling a craft from a remote station.

Another object is to provide a novel control system for banking a craft as a function of the time of a command and for opposing the banking as a function of the extent of turning.

A further object is to provide a novel means for banking a craft an amount corresponding to the time duration of a command and, thereafter, return the craft to level flight.

Still another object is to provide a novel craft control system with a remote and a manual controller and an interlock for rendering the remote controller ineffective on the system upon operation of the manual controller.

A still further object is to provide for changing the magnitude of the control action for a given deviation from reference when the craft is under direct automatic control to a different magnitude when the craft is under remote automatic control.

The present invention contemplates an aircraft control system provided with a novel turn control including a differential which receives a commanded input to develop an output having a characteristic for banking said craft to an extent corresponding to the time duration of the command to turn the craft and which receives an input in response to the extent of turning of the craft to change the characteristic of said output to cancel the banking of the craft so that the craft is returned to a level flight condition on a new heading, a response changer for changing the magnitude of a correction for a given deviation from reference while on remote control, and an interlock for rendering the remote control ineffective when the human pilot takes control.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

The single sheet of drawing illustrates schematically the novel turn control of the present invention incorporated in the roll and yaw control channels of an automatic control system for aircraft.

Turning to the drawing, signals corresponding to deviation of the craft from a predetermined heading are developed by compass 10 and master direction indicator 11.

The compass 10 may be a conventional earth inductor type having three pick-up coils 13 energized by primary windings 14 for periodically excluding the earth's field from the core 15. Varying voltages corresponding to the displacement of the craft with respect to the earth's field are induced in coils 13 as the coils are cut by the earth's flux. The resultant of the voltages correspond to the displacement of the craft with respect to the earth's field.

The voltages in the pick-up coils 13 are reproduced in windings 18 of an inductive receiver 19 which, as long as rotor 20 is in a null position with respect to the resultant in windings 18, develops no signal output at the rotor. However, displacement of the rotor from null position develops a signal which through amplifier 21 operates a conventional induction motor 22 to drive the rotor to a null by way of a gear reduction transmission 23. A conventional rate generator 25 develops a signal at winding 27 to damp the motor operation. Thus, motor 22 maintains rotor 20 at a null position despite various changes in the position of the craft with respect to the earth's field.

When a magnetic clutch 30 is engaged, the operation of motor 22 also displaces rotor 31 of inductive device 32 relative to stator 33. The signal developed at stator 33 then is a heading error signal corresponding in phase and amplitude to the direction and extent of deviation of the craft from the heading at which clutch 30 is engaged. The clutch is energized for engagement when the master switch S is moved to a closed circuit position (by means not shown).

The heading error signal is applied to a conventional amplifier 35 which amplifies and detects the phase of the signal to operate motor 37 in a direction to displace the aileron surface A to return the craft to the engaged heading. Through a suitable mechanical connection 38, motor 37 also displaces the rotor 39 of inductive device 40 relative to its stator 41 to develop a follow-up signal corresponding in phase and amplitude to the direction and extent of displacement. This follow-up signal is applied to the amplifier input in opposition to the heading error signal. Thus, motor 37 operates to displace the aileron until an equal and opposite signal is developed at inductive device 40. The net input to amplifier 35 at this time is zero and the motor operation stops with the aileron surface displaced an amount corresponding to the extent of heading deviation.

As the displaced surface banks the craft, a conventional vertical gyro 42 having an inductive device 43 connected in a well known manner to its roll axis trunnion displaces rotor 44 relative to stator 45 to develop a signal corresponding in phase and amplitude to the direction and extent of banking. As the bank attitude signal builds up to equal and oppose the heading error signal, the signal from follow-up device 40 operates servomotor 37 to return the ailerons to the streamlined position. As the craft turns, the heading error signal decreases and the bank attitude signal prevails to bring the craft back to level flight.

The turning of the craft is coordinated by way of the rudder control channel. The normal vertical and the dynamic vertical of a craft are coaxial when the turn is coordinated and are displaced when the turn is not coordinated. A conventional damped pendulum 50 senses the displacement between the verticals and in known manner displaces rotor 51 of inductive device 52 relative to a stator 53 to develop a signal corresponding in phase and amplitude to the direction and extent of displacement. This signal through a conventional discriminator type amplifier 55 operates an induction motor 56 to displace rudder R.

Through a suitable mechanical connection 58, the operation of motor 56, also displaces rotor 60 of an inductive device 61 relative to stator 62 to develop a follow-up signal corresponding in phase and amplitude to the direction and extent of rudder displacement. As this signal builds up to equal and oppose the signal from the dynamic vertical sensor 50, the net input to amplifier 55 becomes zero and motor 56 stops with the rudder displaced to an extent corresponding to the extent of displacement of the verticals.

As the displaced rudder turns the craft about its yaw axis, a conventional rate of turn gyro 70 responds to this rate of turning to displace in a well known manner the rotor 71 of inductive device 72 relative to its stator 73 to develop a signal corresponding in phase and amplitude to the direction and rate of turning. The signal tends to operate servomotor 56 in a direction to oppose the turning of the craft so as to damp the movement of the craft.

To enable the human pilot to maneuver the craft manually through the control system, a conventional manual controller 80 is provided to displace rotor 81 of inductive device 82 relative to stator 83 to develop a signal in the roll control channel to operate motor 37 to turn the craft. The controller also displaces rotor 84 of inductive device 85 relative to stator 86 to develop a signal in the rudder channel which will be equal and opposite to the signal from inductive device 72 when the craft is turning at the desired rate.

To maintain the craft on a new heading when the manual controller is returned to center position, a cam 90 displaces arm 91 to disengage contacts 92 as the manual controller is turned, thereby opening the circuit from battery B to the coil 95 of magnetic clutch 30 and disengaging the clutch. Thereafter, rotor 31 is maintained in its last position although motor 22 continues to maintain rotor 20 of receiver 19 at null as the craft changes heading. When controller 80 is returned to center position, contacts 92 are engaged and clutch 30 is reengaged to provide a new heading reference.

The automatic control system as so far described is intended to illustrate a conventional automatic control system for aircraft. In accordance with the present invention, novel means are provided for causing the craft to turn at a selected rate and for selectively switching from the constant heading control to the novel rate of turn control. The novel turn control also includes a means for increasing the rapidity of response of the craft to deviations from the commanded condition.

In accordance with the present invention, right or left command signals from a remote transmitter are received by a receiver 100 which, as a result, develops an output at either lead 101 or lead 102; an output at lead 101, for example, being for a turn to the left and the output at lead 102 being for a turn to the right. Leads 101 and 102 feed respective solenoid operated relays 104 or 105. The energization of relay 104 engages armature 107 with contact 108, and the energization of solenoid 105 engages armature 110 with contact 111. Contacts 108 and 111 are connected to the opposite end terminals of a center tapped secondary winding 114 of a transformer 115 whose primary winding 116 is energized from a suitable source of alternating current. Armatures 107 and 110 are connected together by lead 120 and by a lead 122 to a conventional discriminator type amplifier 121 whose output energizes the variable phase winding 124 of a conventional induction motor 125. The energization of contact 108 has a phase opposite to the energization of contact 111. Thus, when armature 107 engages contact 108, motor 125 is operated in a direction opposite to its operation when armature 110 engages contact 111. A conventional rate generator 126 provides a degenerative feed back voltage at winding 127 to regulate the motor speed.

Through a suitable gear train 130 the operation of motor 125 provides one input to a mechanical differential 131 whose second input is provided through a speed up gear ratio 133 by way of motor 22. The input provided by way of gear train 133 is opposite to the input provided by way of gear train 130 and the difference in inputs develops a differential output at shaft 140. When a magnetic clutch 141 is engaged, this output displaces rotor 142 of inductive device 143 relative to stator winding 144 to provide a turn signal for the aileron or roll control channel and by way of the primary winding 146 of a coupling transformer 147 whose secondary winding 148 is connected into the yaw control channel to provide a cross feed to the rudder or yaw control channel.

Assuming that the craft is flying on the desired heading at a level attitude and with switch arm 155 engaging contact 156, the roll and yaw control signal chains are balanced and the craft is maintained on the predetermined heading as discussed above.

Switch arm 155 may advantageously be the arm of a switch of the type described in copending application Serial No. 333,711, now Patent No. 2,734,963, assigned to the assignee of the present invention, wherein the switch arm normally engages contact 156 but once engaged with contact 157, remains engaged with this contact until solenoid 159 is deenergized.

Moving switch arm 155 into engagement with contact 157 places the craft under control of the novel turn control system. The engagement of switch arm 155 and contact 157 opens the circuit to coil 95 of clutch 30 in master direction indicator 11, thereby disengaging the clutch 30. Rotor 31 then remains in its last position although motor 22 continues to operate to maintain rotor 20 of inductive device 19 at a null relative to stator 18. The engagement of arm 155 and contact 157 energizes coil 160 of clutch 141 to engage the clutch so that the differential output shaft 140 can position rotor 142 of inductive device 143.

As long as the craft is flying on the heading at which clutch 141 is engaged, the signal chain to the aileron amplifier 35 remains balanced. Upon deviation of the craft from this heading, motor 22 operates through step-up gear ratio transmission 133 to provide an input to differential 131. The resulting output at shaft 140 of differential 131 displaces rotor 142 of inductive device 143 to develop a signal to bank the craft to correct for the heading error. The signal also is cross fed by way of coupling transformer 147 to the rudder control channel to coordinate the turn. As the craft turns toward the engaged heading, the operation of motor 22 returns rotor 142 toward the null position and the error signal becomes zero as the craft attains level flight at the engaged heading.

Should the remote transmitter send a signal to receiver 100 commanding, for example, a left turn, and assuming that a left turn provides an output at lead 101, solenoid 104 is energized and armature 107 engaged with contact 108. As long as the armature and contact are in engagement, motor 125 operates through gear train 130 to drive one side of differential 131. This displaces rotor 142 relative to stator 144 to develop a signal for the operation of servomotor 37 to displace the aileron; the magnitude of the signal being determined by the length of time armature 107 and contact 108 are in engagement.

As the displaced surface banks the craft, the craft starts to turn in the direction of the lower wing. The turning of the craft develops varying voltages in pick up coils 13. These voltages are reproduced in receiver stator 18 and motor 22 drives rotor 20 to a null position relative to the stator. Motor 22, through gear train 133, also drives one side of differential 131 to turn shaft 140 in a direction opposite to the turning of the shaft by motor 125. This displaces rotor winding 142 in an opposite direction to cause the signal to decrease and return the craft to a level attitude.

Similarly a signal for a right turn received by receiver 100 would develop an output at lead 102 to energize solenoid 105 and operate motor 125 to provide an input at differential 131 to rotate shaft 140 and displace rotor 142 to bank the craft to the right, the extent of displacement of rotor 142 corresponding to the length of time that the signal is applied. The resulting turning of the craft operates motor 22 to provide an input to the differential to rotate shaft 140 in the opposite direction and return rotor 142 to its normal position, thereby returning the craft to level flight on a new heading.

Should the human pilot displace knob 80 while the craft is under remote control, the circuit to solenoid 159 is opened, thereby deenergizing solenoid 159; and switch arm 155 disengages from contact 157 and engages with contact 156 to remove the turn control from the automatic control system. To this end the shaft of knob 80 also includes a cam 190 similar to cam 90 for raising an arm 191 upon displacement of the knob from center position to disengage contacts 192.

The foregoing has presented a novel system for banking a craft for changing craft attitude about one axis by an amount corresponding to the length of time duration of a command signal and a sensing means responsive to the condition about another axis for returning the craft to initial flight attitude on a different reference. The novel system includes an interlock for remote and manual operation. The system also includes means for controlling the craft to one extent in response to a given displacement from a predetermined reference when the craft is under normal control and at another rate when the craft is under control of the remote control.

Although but one embodiment of the invention has been illustrated and described, various changes can be made in the design and arrangement of the parts without departing from the spirit and scope of the invention as the same will now be understood by those skilled in the art.

We claim:

1. An aircraft control system having first and second control channels, comprising reference means responsive to the displacement of said craft from a predetermined reference, first signal means actuated by said reference means a predetermined amount for a given displacement from said reference to develop a first signal, second signal means actuated by said reference means a different predetermined amount for said given displacement to develop a second signal, means for supplying said first signal to said first control channel of said craft, means for supplying said second signal to said first and second control channels, and selective means for actuating said first or second signal means from said reference means.

2. In an automatic control system for aircraft, attitude reference means for normally maintaining said craft in a predetermined attitude, heading reference means for normally maintaining said craft on a predetermined heading, remote controlled means for changing the attitude of said craft to change the heading of the craft, manually operable means for controlling said craft, and means operable when said manually operable means is operated for rendering said heading and remote control means incapable of controlling said craft and placing said craft under control of said attitude reference means and said manually operable means.

3. An aircraft control system comprising power means for banking and turning the craft, signal means having one part displaceable to develop corresponding electric signals for controlling the power means, a pair of motors, radiant energy receiving means for operating one of the motors, heading responsive means for operating the other motor, and a differential driven by said motors and drivably connected to the displaceable part of the signal means.

4. An aircraft control system comprising power means for banking and turning the craft, a pair of signal means for controlling the power means, a pair of motors, radiant energy receiving means for operating one of the motors, heading responsive means for operating the other motor, a differential driven by the motors and drivably connected to one of the signal means, the other signal means being drivably connected to the motor operated by the heading responsive means, and means for selectively driving said other signal means and the differential by the heading responsive motor to maintain the craft on a predetermined heading and for changing the heading of the craft by the radiant energy receiving means.

References Cited in the file of this patent

UNITED STATES PATENTS

| | | |
|---|---|---|
| 1,958,258 | Alexanderson | May 8, 1934 |
| 2,490,844 | Sorensen | Dec. 13, 1949 |
| 2,556,345 | Sivitz et al. | June 12, 1951 |
| 2,620,148 | Baring-Gould et al. | Dec. 2, 1952 |
| 2,705,116 | Yates | Mar. 29, 1955 |
| 2,772,059 | Noxon et al. | Nov. 27, 1956 |
| 2,808,999 | Chenery | Oct. 8, 1957 |